Sept. 5, 1933.     G. GERALDSON     1,925,318
EARTH WORKING IMPLEMENT
Filed May 14, 1932
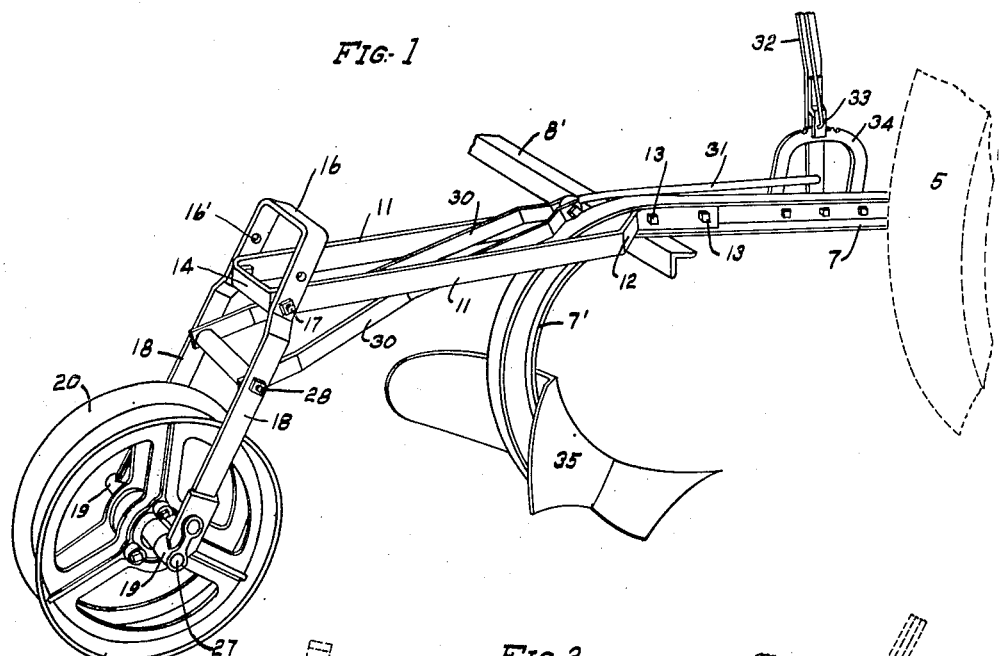
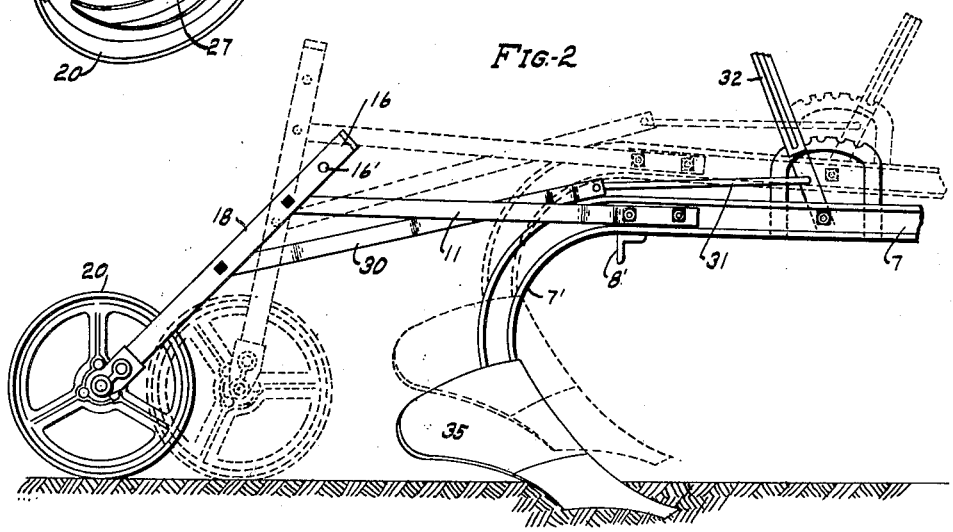
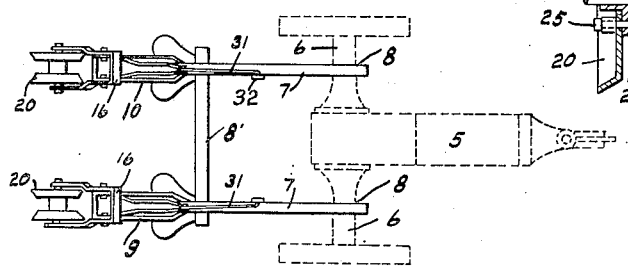
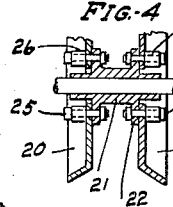
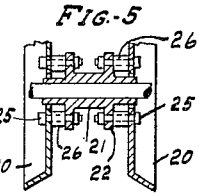
INVENTOR.
GERALD GERALDSON
BY James A. Walsh,
ATTORNEY Patented Sept. 5, 1933

1,925,318

UNITED STATES PATENT OFFICE 1,925,318

EARTH WORKING IMPLEMENT

Gerald Geraldson, Racine, Wis., assignor to J. I. Case Company, Racine, Wis., a corporation Application May 14, 1932. Serial No. 611,303

6 Claims. (Cl. 97—47)

My invention relates to tractor implements, and particularly to means whereby listers, planting devices and the like may be connected to the tractor and adjusted to penetrate the earth at varying depths under control of an operator, said adjusting means being of a character whereby tools for different purposes may be readily attached to and adjusted in relation to the earth, as will hereinafter more fully appear.

In the accompanying drawing, forming part hereof, Figure 1 is a perspective of a lister attachment; Fig. 2, a side elevation thereof; Fig. 3, a diagrammatic view showing the application of my improvement to a tractor; and Figs. 4 and 5 are detail sectional views of the combination gage and press wheels which form part of my improvement.

In said drawing the numeral 5 indicates a tractor, to the rear axle housings 6 of which, or otherwise, beams 7 are pivotally attached, as at 8, Fig. 3, the beams being connected to a cross-member 8'. To said beams 7 I secure tillage tool supporting frames 9, 10, which extend rearwardly and form a continuation of the beams, and as said frames and associated parts are duplicates but one thereof will be necessary to specifically describe, which, as shown in Figs. 1 and 2, preferably comprises the members 11 converging at their forward ends 12 and bolted to the beam, as at 13, said frame having a cross-member 14 at its rear end for purposes of stability. To said frame I pivotally secure a support 16, at 17, comprising legs 18 which terminate in bearings 19 for a combination gage and press wheel assemblage composed of the wheels 20 supported on a hub 21 having flanges 22 which are secured to the wheels by bolts 25 passing through spacers 26, the rims of the wheels inclining toward each other as indicated in Fig. 1. As shown in Fig. 4, said wheels are assembled in close relation for certain operations, but when it is desired to further separate said wheels for other duties this may be readily accomplished by spacing and mounting them as shown in Fig. 5, that is, the wheels 20 are moved outwardly on the axle 27 and the spacers 26 inserted between their inner faces and the flanges 22, in which manner it will be apparent that the treads thereof will be considerably apart. Pivotally mounted on the depending members or legs 18 of the support, as at 28, is a controller arm preferably comprising converging members 30 connected by a link 31 to a lever 32 secured to the beam 7 and having a latch or detent 33 engageable with the notches of a quadrant 34. For illustration I have shown an earth working tool 35 of the lister type secured to the rear end 7' of beam 7, and which latter at its forward end is pivoted to the tractor frame, as at 8, as stated.

In Fig. 3 two earth working tool equipments are shown, each controlled by a lever 32, and the relation of the tools and gage wheels of one of the attachments, as well as the lever, will be apparent from Fig. 2. In operation, it will be understood that in the fall it is customary to list the land by drawing the implement tools therethrough, and with my improvement the depth at which the bottom or tool 35 is to penetrate is controlled by the gage wheels 20 and lever 32, that is to say, when it is desired that the tool shall enter the earth well below the surface the lever 32 is moved in the direction indicated by full lines, Fig. 2, causing the arm 30 to throw the wheels into the position indicated by full lines, thus permitting frame 11 and the beam 7' to lower by gravity through the pivotal connection of the beam 7 with the tractor so that as the tractor moves the tool will penetrate to the depth indicated, or as desired, the gage wheels 20 rolling on the earth surface and maintaining the tool in position to furrow at uniform depth. When a more shallow furrow is desired lever 32 is moved forwardly to engage a predetermined notch in quadrant 34, so that the frame 11, beam 7—7' and tool 35 will be elevated to the required height and varied degrees of penetration thus obtained. The tool may be wholly withdrawn by further adjusting lever 32, with the consequent adjustment of frame 16 to bring the gage wheels 20 into substantial vertical alignment with the end of the frame 11 to sustain the latter and parts associated therewith including the tool 35 in the dotted line position, Fig. 2, the closely assembled gage wheels, as before, rolling upon the earth surface of the furrow. By pivoting the forward end of beam 7 to the tractor it will be understood that a free up and down movement of the beam with connected parts is readily attainable by manipulating lever 32 as explained, and in field operations I have demonstrated that when the depth of tool is substantially as indicated in full lines the wheels 20 follow the furrow surface behind the tool without tendency of digging, as the weight of the beam and frame structure is carried by the tool and therefore no appreciable load or strain is imparted to the wheels, and that when the tool has been withdrawn and the gage wheels thrown forward during such action, as indicated by the dotted lines, said wheels also freely roll upon the furrow surface without undue penetration. It is customary to re-list the earth in the spring, in which operation the tractor wheels are positioned to travel in the furrows previously made, while the tools 35 move through the made hills, throwing the earth thereof into the former furrows and forming new furrows in place of the hills, in which circumstance the gage wheel support 16 is adjusted by pivotally securing the frame 11 thereto by the upper holes 16' and the bolts 17, which adjustment maintains the frame 11 and beams 7 in higher position normally, as it is necessary to hold the tool 35 in proper relation to the previously made hill to assure that it will be evenly removed and furrowed, and by the simple adjustment described the required depth of penetration is accomplished.

When planting devices form part of or are mounted upon a lister equipment substantially as described the seed discharging from the device is deposited in the furrow made by the tool 35, and as the gage wheels follow the seed deposit said wheels act as means for loosely covering the seed and pressing the sides of the earth thereabout into slight ridge formation, and by making the wheel assemblage convertible in substantially the manner described I am enabled to provide narrow or wider treads for seeding or for listing according to requirements.

I claim as my invention:

1. In an earth working implement, a beam adapted to be pivotally connected to a tractor, a tool at the rear end of the beam, a frame extending from the beam and forming a continuation thereof, a gage wheel support, means for pivotally connecting the support to the frame and whereby the support may be adjusted higher or lower in relation to the frame, a lever, and means connecting the lever and support for moving the later rearwardly in inclined position and also forwardly in substantially vertical position in relation to the frame.

2. In an earth working implement, a beam adapted to be pivotally connected to a tractor, a tool at the rear end of the beam, a frame extending from the beam and forming a continuation thereof, a gage wheel support, means for pivotally connecting the support to the frame and whereby the support may be adjusted higher or lower in relation to the frame, a lever, means connecting the lever and support for moving the latter rearwardly in inclined position and also forwardly in substantially vertical position in relation to the frame, and means adapted to be engaged by the lever for maintaining the support and beam in predetermined fixed relation.

3. In an earth working implement, a beam having an earth working tool thereon, a support connected to the beam and having an axle, a hub on the axle, wheels at each side of the hub, means for connecting the wheels to the hub, and interchangeable means associated with the connecting means for converting the wheels to narrow and wide treads.

4. The combination, with an earth working implement, of supporting means including an axle, a flanged hub on the axle, wheels at each side of the hub, means for connecting the wheels to the hub flanges, and spacers connected with the connecting means for maintaining the wheels in closer or farther relation to each other.

5. The combination, with an earth working implement, of supporting means pivotally connected thereto and including depending members, an axle supported by the members, a hub on the axle, wheels on the axle, means for securing the wheels to the hub, and spacing means adapted to be mounted on the outer ends of the connecting means for positioning the wheels close together and also transferred to the connecting means between the hub and wheels for positioning the wheels farther apart.

6. In an earth working implement, a beam adapted to be pivotally connected to a tractor, a tool at the rear end of the beam, a frame extending from the beam and forming a continuation thereof, a support having a gage-wheel mounted thereon, means for pivotally connecting the support to the frame whereby the wheel may be adjusted forwardly and rearwardly along the earth surface, a lever, and means connecting the lever and support for moving the latter rearwardly in inclined position and also forwardly in substantially vertical position in relation to the frame.

GERALD GERALDSON.